United States Patent

[11] 3,621,202

| [72] | Inventor | Rudolf Gemert<br>London, Ontario, Canada |
|---|---|---|
| [21] | Appl. No. | 89,540 |
| [22] | Filed | Nov. 16, 1970 |
| [45] | Patented | Nov. 16, 1971 |
| [73] | Assignee | GSW Limited-GSW Limitee<br>Toronto, Ontario, Canada |

[54] AUTOMATIC DRYING CYCLE FOR CLOTHES DRYERS
1 Claim, 9 Drawing Figs.

[52] U.S. Cl. .................................................. 219/492, 219/400, 34/45
[51] Int. Cl. .................................................. H05b 1/02
[50] Field of Search ............................................ 219/334, 492, 400; 34/45, 48

[56] References Cited
UNITED STATES PATENTS

| 2,807,889 | 10/1957 | Dunkelman | 219/492 |
| 3,181,037 | 4/1965 | Klepp | 219/492 |
| 3,186,417 | 6/1965 | Fay | 219/492 |
| 2,875,526 | 3/1959 | Engel et al. | 34/45 |

Primary Examiner—Bernard A. Gilheany
Assistant Examiner—F. E. Bell
Attorney—Douglas S. Johnson ABSTRACT: A drying control system in automatic dryers involves the use of two thermostats with a timer and heating element, the thermostats being positioned in the exhaust airstream emanating from the drying chamber. The first thermostat is set for a lower temperature range than the second thermostat and both thermostats provide for operation of the heating element until the temperature has risen to a predetermined level, after which the thermostate set in the lower temperature range will switch to bring the timer into the circuit. The heating element continues to draw current through the thermostat set in the higher range but when the temperature reaches the upper level at which the higher range thermostat is set, the latter will open to switch off the heating element. Sequentially, the second thermostat will then cycle on and off until the total time of the timer has expired.

PATENTED NOV 16 1971  3,621,202

INVENTOR.
RUDOLF GEMERT

BY Douglas S. Johnson
Attorney

AUTOMATIC DRYING CYCLE FOR CLOTHES DRYERS

FIELD OF THE INVENTION

This invention relates to automatic clothes dryers and more particular to systems where the exhaust temperature is utilized to control the supply of heat during the drying operation, the exhaust temperature determining the actuation of a thermostat.

PRIOR ART

There are available at the present time domestic clothes dryers which provide a drying operation wherein the machine automatically terminates its operation when the clothes are substantially dry. In such automatic drying cycles, a common arrangement is a basic circuit wherein the electric heating means which provide for heating the air is controlled by a thermostat which responds to the exhaust temperature, which thermostat on activation terminates the electric heating means and brings into operation a timer. This system is based on the fact that initially, when the clothes have a substantial amount of moisture therein, most of the heat energy put into the clothes is used to evaporate the moisture, but as water is removed, the exhaust temperature of the air will rise and relatively sharply once the clothes are dry. The temperature rise is used in the above-described automatic cycle to actuate the thermostat.

The drying process where a single thermostat is used in conjunction with a heating element and a timer functions as follows. When the unit is switched on, the element will heat up but the timer motor will not run. When the exhaust temperature has risen to a predetermined level at which point the clothes generally have about 20 percent water retention, the thermostat will switch to terminate the operation of the heating element and switch on the timer. The temperature will now drop to the level at which the thermostat will close again, switching off the timer and bringing again into operation the heating element and the temperature will rise. This process will be repeated until the time which is set on the timer has expired. In other words, the total time of the drying cycle comprises the time that the element is on together with the time that the timer is running.

The disadvantages of this system are twofold, in that firstly, the system does not work well at temperatures close to ambient because the thermostat will not reclose to switch on the element, and the time would expire before the clothes are dry, and secondly, any blockage of airflow at the thermostat location in the exhaust duct, usually from excessive lint accumulation, would prevent sufficient temperature rise to cause the thermostat to switch off the heat element and switch on the timer and the unit would continue to run indefinitely or until shut off manually.

A particular problem encountered in recent years, due to the introduction of new fabrics, is to dry at low temperatures and it has been found that the system described above does not give sufficient control in order to achieve this end. For instance, if the thermostat is set between 95°–110° F. and the ambient temperature is sufficiently high, extreme drying time would be necessary and it may expire before the clothes are dry. If the operating temperature range is raised substantially, then the fabrics are exposed to undesirably high temperatures for the largest proportion of the total length of drying time.

SUMMARY OF THE INVENTION

It is an object of the present invention to provide a simple ambient compensation system which permits operation at desirably low operating temperatures without adverse results due to high ambient conditions. The invention consists in providing two thermostats in the system, which includes a timer and a heating element. The first thermostat is set at a lower temperature range than the second thermostat. Both thermostats provide for operation of the heating element during which the heat energy input causes only a gradual rise in temperature and the energy used to evaporate the moisture approximately equals the energy input in heat. The switching of the thermostat is responsive to the temperature rise of the exhaust of air from the dryer and when the temperature has risen to a predetermined level at which there is approximately 20 percent moisture in the clothes, the thermostat set in the lower temperature range will switch so as to bring the timer into the circuit. The heating element continues to draw current through the thermostat set in the higher range and the temperature will keep on rising with the timer running. However, when the temperature reaches the upper level of the range at which the second thermostat is set, the latter will open and switch off the element. Sequentially, this second thermostat will now cycle on and off until the total time of the timer has expired.

BRIEF DESCRIPTION OF THE DRAWINGS

The invention will now be described in relation to the accompanying drawings, in which.

DESCRIPTION OF PREFERRED EMBODIMENT

Figure 1:
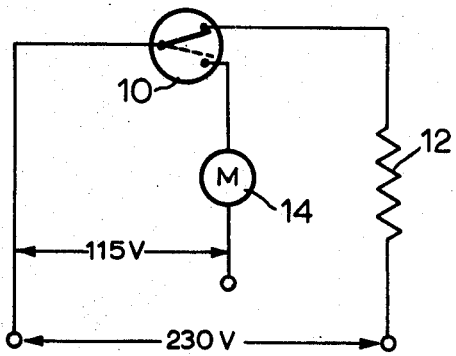
FIG. 1 shows a basic circuit of an automatic drying cycle for clothes dryers.

Referring now more particularly to FIG. 1 there is shown a basic circuit of an automatic drying cycle for clothes dryers which includes a thermostat 10, a heating element 12 and a timer motor 14. When the circuit is switched on the heating element 12 will heat up, but the timer motor 14 will not run. The thermostat 10 is positioned in the exhaust airstream.

Figure 2:
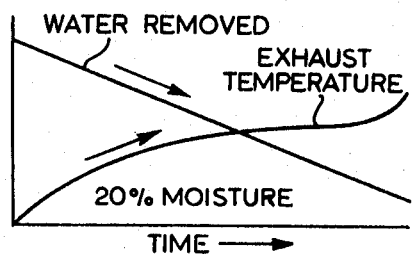
FIG. 2 is a graph showing the relationship of the exhaust temperature to the amount of water removed in the basic circuit shown in FIG. 1.

When the exhaust temperature has risen to a predetermined level at which point the clothes have about 20 percent water retention, as illustrated in the graph in FIG. 2, the thermostat 10 will switch to cut off the element 12 and switch on the timer 14.

Figure 3:
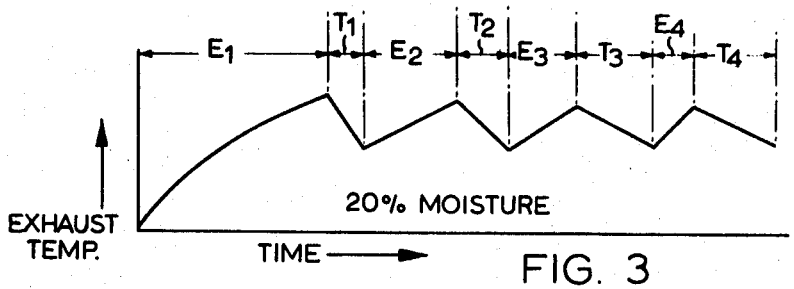
FIG. 3 is a graph showing the relationship of exhaust temperature to the total time of drying of a cycle using the basic circuit shown in FIG. 1.

As illustrated in the graph in FIG. 3 the temperature in the system will now drop to the closing temperature of the thermostat 10, the time being indicated by the portion marked $T_1$ with the previous time in which the heating element 12 has been in operation denoted as $E_1$. The temperature will then rise and drop until the time on the timer 14 has expired.

Referring more particularly to FIG. 3 the total time of the drying cycle is $E_1+T_1+E_2+T_2+E_3+T_3+E_4+t_4$, it will be clear that the total time that the element is on is $E_1+E_2+E_3+E_4$ and that the total time that the timer is running is $T_1+T_2+T_3+T_4$.

As previously mentioned this system has two disadvantages, the first being that it does not work well at temperatures close to ambient because the single thermostat 10 will not reclose to switch on the element 12 with the result that the time would expire before the clothes are dry. Secondly, any blockage of airflow at the thermostat 10, located in the exhaust airstream, usually from excess lint accumulation, would present sufficient temperature rise to cause the thermostat 10 to switch off the element 12 and switch on the timer 14 and the unit would continue to run indefinitely or until shut off manually.

Due to the introduction of new fabrics it is desirable to dry at lower temperatures than those previously used materials made of natural materials. The system already described does not allow this to be done but the system developed according to this invention eliminates the problem created by operating a thermostat close to ambient temperatures while at the same time it utilizes the timing period to the maximum.

Figure 4:
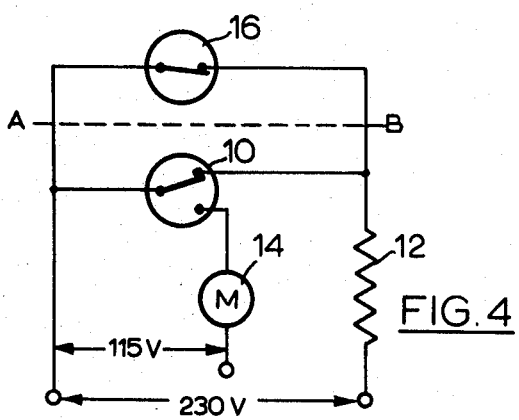
FIG. 4 shows a circuit incorporating the present invention and utilizing two thermostats switched to the heating element.
Figure 5:
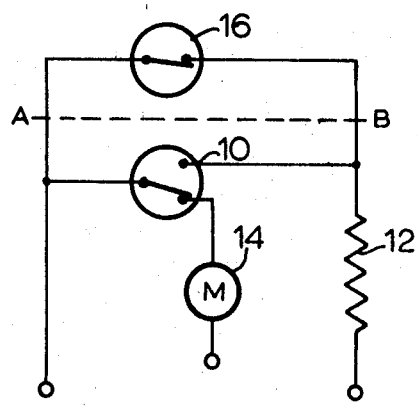
FIG. 5 is the same circuit as that shown in FIG. 4 with one thermostat, while set at a lower temperature than the other, is switched to the timer from the heating element.

Referring now to FIG. 4 it will be observed that the system involves utilizing an additional thermostat 16 into the circuit already described and illustrated in FIG. 1. The thermostat 16 is calibrated at a higher temperature than the thermostat 10. The temperature rise in the exhaust air when the water is removed is also used in this system to activate the thermostats 10 and 16. Accordingly, when the circuit, shown in FIG. 4, comes into operation the element 12 will heat up and the current flow will be through the thermostat 10 whilst the timer 14 does not run. When the temperature has risen to a predetermined level at which point again there is approximately 20 percent moisture in the clothes, the thermostat 10 will now switch to bring the timer 14 into the circuit as illustrated in FIG. 5. The element 12 continues to draw the current through the thermostat 16 because this is calibrated at a higher temperature than the thermostat 10.

Figure 6:
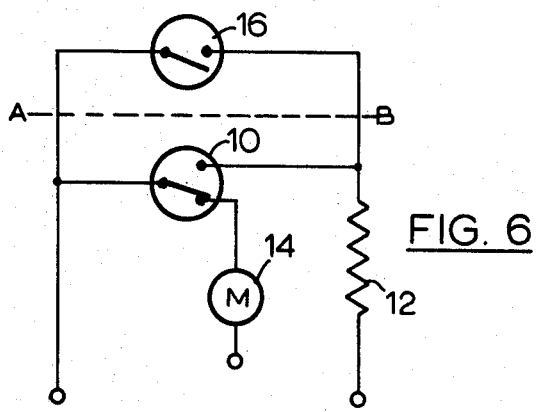
FIG. 6 is the circuit shown in FIGS. 4 and 5 in which both thermostats are switched from the heating element.

The temperature will keep on rising with the running of the timer 14 and when the temperature reaches the upper point of the higher range of calibration of the thermostat 16, it will open and switch off the element 12, see FIG. 6, the thermostat 16 will now cycle on and off until the total time of the timer 14 has expired.

Figure 7:
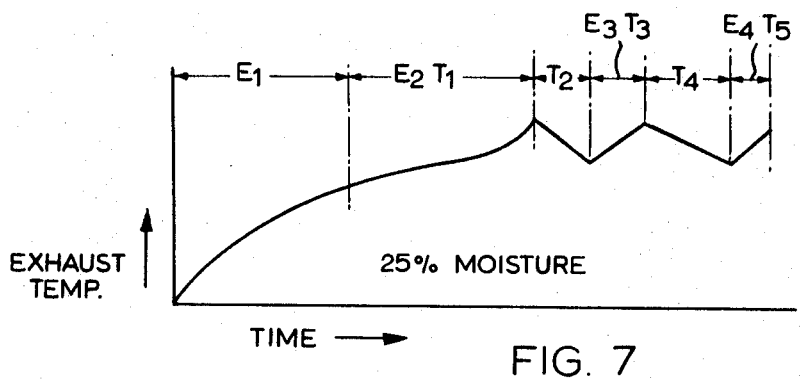
FIG. 7 is a graph of the relationship of exhaust temperature to time of drying using the circuit illustrated in FIGS 4, 5 and 6.

FIG. 7 shows graphically what happens in this system as compared to with the one previously described, the total time of the drying cycle is $E_1+E_2T_1+T_2+E_3T_3+T_4+E_4T_5$ with the total time in which the element 12 is on is $E_1+E_2+E_3+E_4$ and the total time that the timer 14 is $T_1+T_2+T_3+T_4+T_5$.

The important factor is that the timer 14 will run continuously from the point marked X and the advantage of this system is that it will work in any temperature condition even those close to ambient. The result is that the thermostat 10 may be set to operate in a range, the low level of which is close to ambient temperature.

Figure 8:
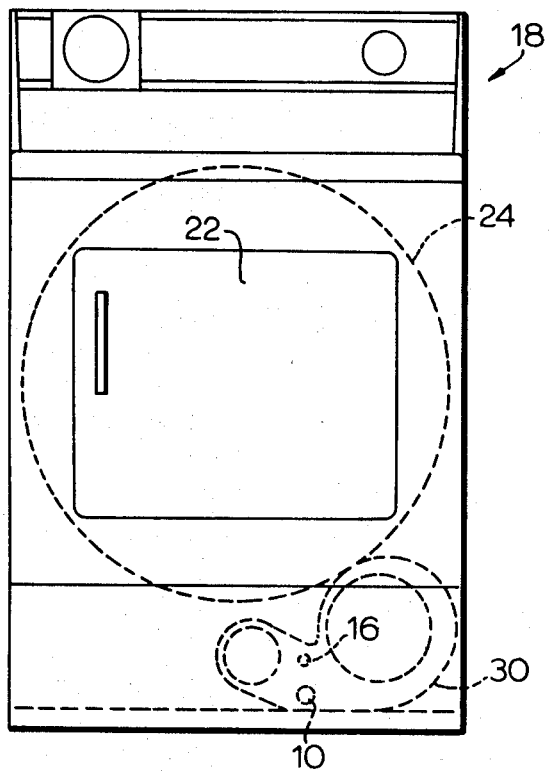
FIGS. 8 and 9 are schematic sectional views of one form of drying utilizing the system of this invention.
Figure 9:
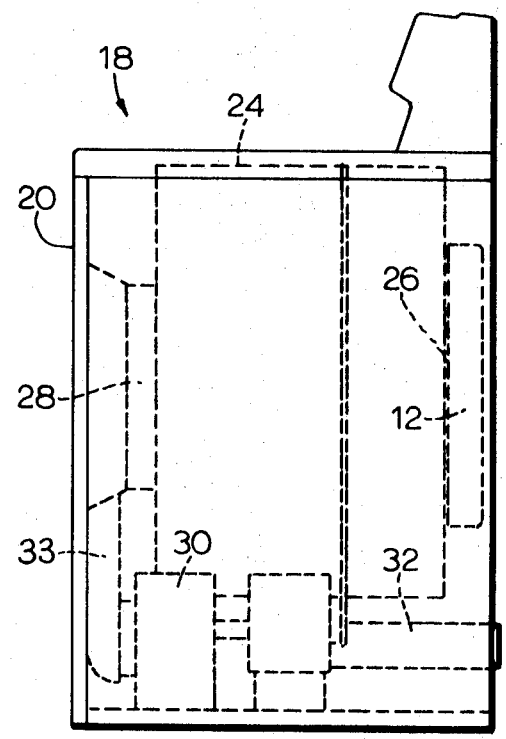

The system of the invention described above is particularly useful in a dryer schematically illustrated in FIGS. 8 and 9 with only the parts necessary to understand this invention being described. The dryer, generally denoted by the numeral 18, comprises a front wall 20 having an entrance door thereto 22 and a contained rotatable drum 24. Heating elements 12 are located in the rear of the dryer 18 and air drawn from the atmosphere passes over these elements 12 to enter the drum 24 through an inlet 26, exits through an outlet 28 spaced from the door 22, and is pulled down through duct 33 by a blower 30, on the exhaust side of which the pair of thermostats 10 and 16 are located, and is forced out of the dryer 18 through exhaust extension 32.

I claim:
1. A fabric drying machine comprising:
  a. a fabric container having an air inlet opening communicating with the atmosphere;
  b. exhaust passage means leading from said container;
  c. means for circulating air through a said container;
  d. electrically activated heating means for heating air passing into and through said container;
  e. a first and second thermostatically controlled switch located in said exhaust passage means;
  f. said first switch being set to operate at a lower temperature range than said second switch, with both connected in series to said heating means in the range of temperature for said first switch, with both switches connected in parallel;
  g. a timer motor;
  h. and said first switch being switched from said heating means to series connection with said timer motor when the temperature in said exhaust passage means reaches the upper limit of the range in which said first switch is set to operate and said second switch cycling said heating means within the range in which said second switch is set.

* * * * *